(12) United States Patent
Phelps et al.

(10) Patent No.: US 6,787,632 B2
(45) Date of Patent: Sep. 7, 2004

(54) ORGANO-TITANATE CATALYSTS FOR PREPARING PURE MACROCYCLIC OLIGOESTERS

(75) Inventors: Peter D. Phelps, Schenectady, NY (US); Timothy A. Thompson, Clifton Park, NY (US); Yi-Feng Wang, Waterford, NY (US); Donald G. Le Grand, Burnt Hills, NY (US)

(73) Assignee: Cyclics Corporation, Schenectady, NY (US)

( * ) Notice: Subject to any disclaimer, the term of this patent is extended or adjusted under 35 U.S.C. 154(b) by 0 days.

(21) Appl. No.: 09/974,722

(22) Filed: Oct. 9, 2001

(65) Prior Publication Data

US 2003/0114640 A1 Jun. 19, 2003

(51) Int. Cl.$^7$ ................................................ C08F 6/00
(52) U.S. Cl. ..................... 528/480; 528/271; 528/272; 528/279; 528/481
(58) Field of Search ............................ 528/271, 272, 528/279, 480, 481

(56) References Cited

U.S. PATENT DOCUMENTS

| | | | |
|---|---|---|---|
| 2,628,171 A | 2/1953 | Green | 106/271 |
| 3,018,272 A | 1/1962 | Griffing et al. | 260/75 |
| 3,090,753 A | 5/1963 | Matuszak et al. | 252/42.7 |
| 3,786,067 A | 1/1974 | Throckmorton et al. | 260/327 |
| 4,568,703 A | 2/1986 | Ashida | 521/124 |
| 4,590,259 A | 5/1986 | Kosky et al. | 528/272 |
| 4,605,731 A | 8/1986 | Evans et al. | 528/371 |
| 4,616,077 A | 10/1986 | Silva | 528/371 |
| 4,638,077 A | 1/1987 | Brunelle et al. | 558/281 |
| 4,644,053 A | 2/1987 | Brunelle et al. | 528/371 |
| 4,727,134 A | 2/1988 | Brunelle et al. | 528/371 |
| 4,740,583 A | 4/1988 | Brunelle et al. | 528/370 |
| 4,757,132 A | 7/1988 | Brunelle et al. | 528/357 |
| 4,785,060 A | 11/1988 | Nagler | 525/444 |
| 4,816,548 A | 3/1989 | Evans et al. | 528/370 |
| 4,829,144 A | 5/1989 | Brunelle et al. | 528/176 |
| 4,831,001 A | 5/1989 | Evans et al. | 502/153 |
| 4,888,411 A | 12/1989 | Shannon et al. | 528/199 |
| 4,904,810 A | 2/1990 | Brunelle et al. | 558/281 |
| 4,909,846 A | 3/1990 | Barfuth et al. | 106/22 |
| 4,980,453 A | 12/1990 | Brunelle et al. | 528/352 |
| 4,992,228 A | 2/1991 | Heck et al. | 264/135 |
| 4,999,420 A | 3/1991 | Leitz et al. | 528/371 |
| 5,006,637 A | 4/1991 | Guggenheim et al. | 528/355 |
| 5,023,346 A | 6/1991 | Schon et al. | 549/231 |

(List continued on next page.)

FOREIGN PATENT DOCUMENTS

| | | |
|---|---|---|
| BE | 676324 | 6/1966 |
| DE | 3607627 A1 | 9/1987 |
| DE | 4034574 A1 | 5/1992 |
| EP | 0000544 B1 | 8/1982 |
| EP | 419254 A2 | 3/1991 |
| EP | 486832 A2 | 5/1992 |
| EP | 264835 B1 | 6/1992 |
| EP | 235741 B1 | 1/1993 |
| EP | 543492 A1 | 5/1993 |
| EP | 589640 A1 | 3/1994 |
| EP | 598604 A1 | 5/1994 |
| EP | 601753 A1 | 6/1994 |
| EP | 635512 A1 | 1/1995 |
| EP | 655476 A1 | 5/1995 |
| EP | 436186 B1 | 10/1995 |
| EP | 688778 A1 | 12/1995 |
| EP | 0714926 A2 | 6/1996 |
| EP | 699701 A3 | 9/1996 |
| GB | 798412 | 8/1954 |
| GB | 957841 | 5/1964 |
| GB | 991020 | 5/1965 |
| GB | 1108921 | 4/1968 |
| JP | 4621873 | 6/1971 |
| JP | 476425 | 10/1972 |
| JP | 6275547 | 4/1987 |

(List continued on next page.)

OTHER PUBLICATIONS

Chisholm et al. "Syntheses and structural characterization of 2,2'–methylene–bis(6–t–butyl–4–methyl–phenoxide) complexes of titanium, zirconium and tantalum," *Polyhedron*, vol. 16, No. 17, (1997) pp. 2941–2949.

Durfee et al. "Chemical and Electrochemical Reduction of Titanium (IV) Aryloxides," *Inorganic Chemistry*, 24 (1985) pp. 4569–4573.

Fantacci et al. "Density Functional Study of Tetraphenolate and Calix[4]arene Complexes of Early Transition Metals," *Inorganic Chemistry*, 40 (2001) pp. 1544–1549.

Hamb et al. "Synthesis of Cyclic Tris(Ethylene Terephthalate)," *Polymer Letters*, 5 (1967), pp. 1057–1058.

Okuda et al. "Synthesis and Characterization of Mononuclear Titanium Complexes Containing a Bis(phenoxy) Ligand Derived from 2,2'–Methylene–bis(6–tert–butyl–4–methylphenol)," *Chem. Ber.*, vol. 128, (1995) pp. 221–227.

Toth et al. "Towards supported catalyst models: the synthesis, characterization, redox chemistry, and structures of the complexes Ti(Oar')$_4$ (Ar'=C$_6$H$_4$(2–t–Bu), C$_6$H(2,3,5, 6–Me)$_4$)," *Canadian Journal of Chemistry*, vol. 69, (1991) pp. 172–178.

Youk et al. "Polymerization of Ethylene Terephthalate Cyclic Oligomers with Antimony Trioxide," *Macromolecules*, 33 (2000), pp. 3594–3599.

U.S. patent application Ser. No. 10/102,162, Wang et al., filed Mar. 20, 2002.

(List continued on next page.)

*Primary Examiner*—Terressa Boykin
(74) *Attorney, Agent, or Firm*—Testa, Hurwitz & Thibeault, LLP

(57) ABSTRACT

Organo-titanate catalysts are prepared that are useful to catalyze depolymerization of a polyester to produce macrocyclic oligoesters substantially free from macrocyclic co-oligoesters.

33 Claims, No Drawings

U.S. PATENT DOCUMENTS

| | | | |
|---|---|---|---|
| 5,039,783 A | 8/1991 | Brunelle et al. | 528/272 |
| 5,071,711 A | 12/1991 | Heck et al. | 428/542.8 |
| 5,095,088 A | 3/1992 | Wang | 528/203 |
| 5,097,008 A | 3/1992 | Krabbenhoft et al. | 528/371 |
| 5,116,900 A | 5/1992 | Flautt et al. | 524/377 |
| 5,191,013 A | 3/1993 | Cook et al. | 524/601 |
| 5,191,038 A | 3/1993 | Krabbenhoft et al. | 525/462 |
| 5,207,850 A | 5/1993 | Parekh | 156/166 |
| 5,214,158 A | 5/1993 | Brunelle et al. | 549/267 |
| 5,225,129 A | 7/1993 | van den Berg | 264/85 |
| 5,231,161 A | 7/1993 | Brunelle et al. | 528/272 |
| 5,237,042 A | 8/1993 | Kim et al. | 528/279 |
| 5,241,880 A | 9/1993 | Mizobata et al. | 74/502.5 |
| RE34,431 E | 11/1993 | Brunelle et al. | 528/352 |
| 5,264,548 A | 11/1993 | Brunelle et al. | 528/370 |
| 5,281,669 A | 1/1994 | Kambour et al. | 525/177 |
| 5,288,837 A | 2/1994 | Munjal et al. | 528/198 |
| 5,300,392 A | 4/1994 | Odell et al. | 430/130 |
| 5,300,393 A | 4/1994 | Odell et al. | 430/134 |
| 5,300,590 A | 4/1994 | Cook et al. | 525/444 |
| 5,302,484 A | 4/1994 | Odell et al. | 430/127 |
| 5,314,779 A | 5/1994 | Odell et al. | 430/127 |
| 5,321,117 A | 6/1994 | Brunelle | 528/272 |
| 5,340,909 A | 8/1994 | Doerr et al. | 528/276 |
| 5,348,985 A | 9/1994 | Pearce et al. | 521/124 |
| 5,356,984 A | 10/1994 | Carbone et al. | 524/431 |
| 5,386,037 A | 1/1995 | Takekoshi et al. | 549/206 |
| 5,387,666 A | 2/1995 | Takekoshi et al. | 528/283 |
| 5,389,719 A | 2/1995 | Takekoshi et al. | 524/784 |
| 5,407,984 A | 4/1995 | Brunelle et al. | 524/178 |
| 5,410,014 A | 4/1995 | Haese et al. | 528/196 |
| 5,420,226 A | 5/1995 | Hamer et al. | 528/201 |
| 5,434,244 A | 7/1995 | Warner et al. | 528/490 |
| 5,446,122 A | 8/1995 | Warner et al. | 528/279 |
| 5,466,744 A | 11/1995 | Evans et al. | 524/714 |
| 5,498,651 A | 3/1996 | Brunelle | 524/176 |
| 5,519,108 A | 5/1996 | You et al. | 528/287 |
| 5,527,976 A | 6/1996 | Takekoshi et al. | 585/16 |
| 5,530,052 A | 6/1996 | Takekoshi et al. | 524/447 |
| 5,591,800 A | 1/1997 | Takekoshi et al. | 524/783 |
| 5,605,979 A | 2/1997 | Priddy, Jr. et al. | 525/439 |
| 5,637,655 A | 6/1997 | Priddy, Jr. et al. | 525/438 |
| 5,646,306 A | 7/1997 | Elsasser, Jr. | 549/267 |
| 5,648,454 A | 7/1997 | Brunelle | 528/491 |
| 5,654,395 A | 8/1997 | Jackson et al. | 528/308.3 |
| 5,661,214 A | 8/1997 | Brunelle et al. | 524/783 |
| 5,663,282 A | 9/1997 | Todt et al. | 528/274 |
| 5,668,186 A | 9/1997 | Brunelle et al. | 521/48 |
| 5,693,722 A | 12/1997 | Priddy, Jr. et al. | 525/439 |
| 5,700,888 A | 12/1997 | Hall | 526/190 |
| 5,707,439 A | 1/1998 | Takekoshi et al. | 106/483 |
| 5,710,086 A | 1/1998 | Brunelle et al. | 502/171 |
| 5,756,644 A | 5/1998 | Hodge et al. | 528/272 |
| 5,760,161 A | 6/1998 | Goins, Jr. et al. | 528/299 |
| 5,786,440 A | 7/1998 | Kohler et al. | 528/196 |
| 5,795,423 A | 8/1998 | Johnson | 156/166 |
| 5,830,541 A | 11/1998 | Carswell et al. | 427/475 |
| 5,936,029 A | 8/1999 | Hall | 524/572 |
| 5,968,642 A | 10/1999 | Saito | 428/304.4 |
| 6,080,834 A | 6/2000 | Putzig et al. | 528/279 |
| 6,121,466 A | 9/2000 | Osterholt et al. | 549/267 |
| 6,297,330 B1 | 10/2001 | Burch, Jr. et al. | 525/444 |
| 6,369,157 B1 | 4/2002 | Winckler et al. | 524/783 |
| 6,376,026 B1 | 4/2002 | Correll et al. | 427/512 |
| 6,420,047 B2 | 7/2002 | Winckler et al. | 428/480 |
| 6,420,048 B1 * | 7/2002 | Wang | 428/480 |
| 6,436,548 B1 | 8/2002 | Phelps | 428/480 |
| 6,436,549 B1 * | 8/2002 | Wang | 428/480 |
| 6,458,972 B1 * | 10/2002 | Surburg et al. | 549/266 |
| 6,525,164 B2 | 2/2003 | Faler | 528/279 |

FOREIGN PATENT DOCUMENTS

| | | |
|---|---|---|
| JP | 62141063 A | 6/1987 |
| JP | 63156824 A | 11/1988 |
| JP | 02298512 | 12/1990 |
| JP | 08-093594 | 4/1996 |
| JP | 09048876 | 2/1997 |
| JP | 09-110832 | 4/1997 |
| JP | 09-238806 | 9/1997 |
| JP | 10-069915 | 3/1998 |
| JP | 10-194262 | 7/1998 |
| JP | 11-136942 | 5/1999 |
| JP | 2001031846 | 2/2001 |
| JP | 2002293902 | 10/2002 |
| JP | 2002293903 | 10/2002 |
| JP | 2002308969 | 10/2002 |
| JP | 2002317041 | 10/2002 |
| JP | 02320499 | 11/2002 |
| JP | 02322272 | 11/2002 |
| JP | 02338672 | 11/2002 |
| SU | 1077893 | 3/1984 |
| WO | 88/06605 | 9/1988 |
| WO | 91/09899 | 7/1991 |
| WO | 93/04106 | 3/1993 |
| WO | 95/00574 | 1/1995 |
| WO | 95/30702 | 11/1995 |
| WO | 96/22319 | 7/1996 |
| WO | 99/25485 | 5/1999 |
| WO | 00/27632 | 5/2000 |
| WO | 01/53379 A1 | 7/2001 |
| WO | 01/56694 A1 | 8/2001 |
| WO | 02/18476 A2 | 3/2002 |
| WO | 02/22738 A2 | 3/2002 |
| WO | 02/098946 A1 | 12/2002 |
| WO | 03/031496 A1 | 4/2003 |

OTHER PUBLICATIONS

U.S. patent application Ser. No. 10/040,530, Wang., filed Jan. 7, 2002.

U.S. patent application Ser. No. 09/945,233, Faler, filed Aug. 31, 2001.

U.S. patent application Ser. No. 09/906,385, Wang, filed Jul. 16, 2001.

U.S. patent application Ser. No. 09/874,706, Wang, filed Jun. 5, 2001.

U.S. patent application Ser. No. 09/754,943, Winckler et al., filed Jan. 4, 2001.

U.S. patent application Ser. No. 09/659,975, Phelps, Sep. 12, 2000.

Brunello et al. (1997) "Semi–crystalline Polymers via Ring–Opening Polymerization: Preparation and Polymerization of Alkylene Phthalate Cyclic Oligomers" *Polymers Preprints* vol. 38, No. 2, pp. 381–382.

Lui et al. (1999) "Preparation of Cyclic Polyester Oligomers and Ultra–Low VOC Polyester Coatings" *Polymer Reprints*, vol. 40, No. 1, pp. 137–138.

Form PCT/ISA/206 including Annex, "Communication Relating to the Results of the Partial Interational Search", PCT/US02/31733, Date of mailing Jan. 30, 2003.

Ahjopalo, L. et al. (2000) "Cyclic Oligomers in Saturated Polyesters" Polymer, vol. 41, No. 23, 8283–8290.

Brunelle (1995) "Macrocycles For The Synthesis of High Molecular Weight Polymers" pp. 197–235, ch. 6, New Methods of Polymer Synthesis: vol. 2, edited by J.R. Ebdon and G.C. Eastmond.

Brunelle et al. (1998) "Semicrystalline Polymers via Ring–Opening Polymerization: Preparation and Polymerization of Alkylene Phthalate Cyclic Oligomers" *Macromolecules* vol. 31, 4782–4790.

Burch, R. R. et al. (2000) "Synthesis of Cyclic Oligoesters and Their Rapid Polymerization to High Molecular Weight" Macromolecules, vol. 33, No. 14, 5053–5064.

Cotton, N. J. et al. (1993) "Rate and Extent of Supercritical Fluid Extraction of Cyclic Trimer from Poly(Ethylene Terephthalate) at Elevated Temperatures" *Journal of Chromatographic Science*, vol. 31, No. 5, 157–161.

Hamilton et al. (1998) "Cyclic Polyesters: Part 8. Preparation and Characterization of Cyclic Oligomers in Six Aromatic Ester and Ether–Ester Systems" *Polymer* vol. 39, No. 14., 3241–3252.

Harrison, A. G. et al. (1997) "Analysis of cyclic oligomers of poly(ethylene terephthalate) by liquid chromatography/mass spectrometry" Polymer Communications, vol. 38, No. 10, 2549–2555.

Henshaw et al. (1994) "Recycling of a Cyclic Thermoplastic Composite Material by Injection and Compression Molding" *J. of Thermoplastic Composite Materials* vol. 7 (1), 14–29.

Hubbard, P. A. (1996) "Polyesters via Macrocyclic Oligomers" Dissertation presented at the University of Akron.

Kricheldorf, H. R. et al. (1997) "Macrocycles IV. Macrocyclic Polyactones as Bifunctional Monomers for Polycondensations" *Journal of Polymer Science*, vol. 36, No. 9, 1373–1378.

Kricheldorf, H. R. et al. (1998) "Macrocycles. 3. Telechelic Polyactones via Macrocyclic Polymerization" Macromolecules, vol. 31, No. 3, 614–620.

Lattimer et al. (1998) "MALDI–MS Analysis of Pyrolysis Products From a Segmented Polyurethane" *Journal of Analytical and Applied Pyrolysis*, vol. 48, 1–15.

Liu et al. (1999) "Preparation of Cyclic Polyester Oligomers and Ultra–Low VOC Polyester Coatings" *Polymer Preprints*, vol. 40, No. 1.

Martin et al. (1987) "Pultrusion", *Engineered Materials Handbook: vol. 1 Composites*, pp. 533–543.

Miller S. (1998) "Macrocyclic polymers from cyclic oligomers of poly(butylene terephthalate)" Dissertation Presented at University of Massachusetts, Amherst, MA US.

Mueller, F. J. et al. (1983) "Synthesis of Cyclic Oligomers of Butylene Terephthalate" *Makromol. Chem.*, vol. 184, No. 12, 2487–95.

Mueller, F. J. et al. (1983) "Synthesis of Cyclic Oligomers of Butylene Terephthalate" *Makromol. Chem.*, vol. 184, No. 12, 2487–95. (Translation).

Perovic, A. (1985) "Morphological Instability of poly(ethylene terephthalate) cyclic oligomer crystals" *Journal of Material Science*, vol. 20, Iss. 4, 1370–1374.

Perovie et al. (1982) "Crystallization of Cyclic Oligomers in Commercial Poly(ethleneterephthalate) Films" *Polymer Bulletin* vol. 6, 277–283.

Roelens, S. (1988) "Organotin–Mediated Synthesis of Macrocyclic Polyesters: Mechanism and Selectivity in the Reaction of Dioxastannolanes with Diacyl Dichlorides" *Journal of the Chemical Society, Perkin Transactions 2*, vol. 8, 1617–1625.

* cited by examiner

ORGANO-TITANATE CATALYSTS FOR PREPARING PURE MACROCYCLIC OLIGOESTERS

TECHNICAL FIELD

This invention generally relates to catalysts. More particularly, the invention relates to organo-titanate catalysts useful for preparing macrocyclic oligoesters.

BACKGROUND INFORMATION

Linear polyesters such as poly(alkylene terephthalate) are generally known and commercially available where the alkylene typically has 2 to 8 carbon atoms. Linear polyesters have many valuable characteristics including strength, toughness, high gloss, and solvent resistance. Linear polyesters are conventionally prepared by the reaction of a diol with a dicarboxylic acid or its functional derivative, typically a diacid halide or ester. Linear polyesters may be fabricated into articles of manufacture by a number of techniques including extrusion, compression molding, and injection molding.

Recently, macrocyclic oligoesters were developed which are precursors to linear polyesters. Macrocyclic oligoesters exhibit low melt viscosity, which can be advantageous in some applications. Furthermore, certain macrocyclic oligoesters melt and polymerize at temperatures well below the melting point of the resulting polymer. Upon melting and in the presence of an appropriate catalyst, polymerization and crystallization can occur virtually isothermally.

One method for synthesis of the macrocyclic oligoesters includes the step of contacting a diol of the formula HO—A—OH with a diacid chloride of the formula:

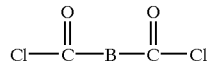

where A is an alkylene, or a cycloalkylene or a mono- or polyoxyalkylene group; and B is a divalent aromatic or alicyclic group. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is between about −25° C. and about 25° C. See, e.g., U.S. Pat. No. 5,039,783 to Brunelle et al.

Macrocyclic oligoesters may also be prepared via the condensation of a diacid chloride with at least one bis (hydroxyalkyl) ester such as bis(4-hydroxybutyl) terephthalate in the presence of a highly unhindered amine or a mixture thereof with at least one other tertiary amine such as triethylamine, in a substantially inert organic solvent such as methylene chloride, chlorobenzene, or a mixture thereof. See, e.g., U.S. Pat. No. 5,231,161 to Brunelle et al.

Another method for preparing macrocyclic oligoesters is to depolymerize linear polyester polymers in the presence of an organotin or titanate compound. In this method, linear polyesters are converted to macrocyclic oligoesters by heating a mixture of a linear polyester, an organic solvent, and a trans-esterification catalyst such as a tin or titanium compound. The solvents used, such as o-xylene and o-dichlorobenzene, usually are substantially free of oxygen and water. See, e.g., U.S. Pat. Nos. 5,407,984 to Brunelle et al. and 5,668,186 to Brunelle et al.

To be useful for the preparation of macrocyclic oligoesters, the organo-titanate catalyst should be soluble in the solvent of the depolymerization reaction, should be in a physical state that allows it to be readily added to the reaction, and should be an active catalyst capable of establishing the desired equilibrium in a reasonable time. Catalysts prepared from tetraisopropyl titanate and two equivalents of butanediol, for example, tend to polymerize and gel from solution. To circumvent this gelation, diethylene glycol was used to substitute part of the butanediol. One technique for preparation of organo-titanate catalysts uses butanediol together with diethylene glycol. See, U.S. Pat. No. 5,710,086 to Brunelle et al. Catalysts prepared according to this method contain moieties of diethylene glycol, which are later incorporated into the macrocyclic oligoesters prepared using the catalysts. The incorporation of diethylene glycol moieties causes deleterious effects on the mechanical properties (e.g., modulus) and thermal properties (e.g., melting point and heat distortion temperature) of the polyester prepared from the macrocyclic oligoesters.

Unfortunately, it is desirable for certain applications such as automotive paint oven or rapid molding and cycle time to employ pure macrocyclic oligoesters, i.e., macrocyclic oligoesters substantially free from macrocyclic co-oligoesters. To conduct molding at high speed, the material (e.g., polybutylene terephthalate polymerized from macrocyclic oligoesters) that is molded needs to crystallize rapidly. High purity is thus required. Also, in making a part by automotive paint oven, the part is less likely to deflect if the material (e.g., polybutylene terephthalate polymerized from macrocyclic oligoesters) has a high heat distortion temperature. In addition, higher crystallinity generally leads to higher modulus and better creep resistance. Furthermore, employing pure macrocyclic oligoesters (e.g., macrocyclic butylene oligoesters) simplifies the manufacturing and product-recovering process as there is no contamination with other diols (e.g., diols derived from diethylene glycol). Methods that lead to pure macrocyclic oligoesters are thus desired.

SUMMARY OF THE INVENTION

It has been discovered that organo-titanate catalysts of the invention are useful for preparing macrocyclic oligoesters that are substantially free from macrocyclic co-oligoesters. Further, the organo-titanate catalysts of the invention may be used to prepare macrocyclic co-oligoesters.

In one aspect, the invention is directed to a mixture of reaction products of

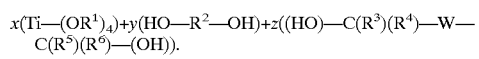

The mixture is substantially free from di-functional diols other than HO—$R^2$—OH. Each $R^1$ is independently a $C_1$–$C_{10}$ alkyl group. $R^2$ is a $C_2$–$C_6$ alkylene group. Each of $R^3$, $R^4$, $R^5$, and $R^6$ is independently a hydrogen atom or a $C_1$–$C_4$ alkyl group except that at least one on $R^3$ and $R^4$ is a $C_1$–$C_4$ alkyl group and at least one of $R^5$ and $R^6$ is a $C_1$–$C_4$ alkyl group. W is an oxygen atom, a sulfur atom, a nitrogen-containing group, a phosphorus-containing group, or a $C_1$–$C_4$ alkylene group. Each of x and y is greater than 0. In addition, y is larger than z.

In another aspect, the invention is directed to a mixture of reaction products of

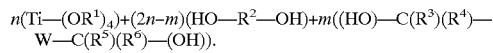

The mixture is substantially free from di-functional diols. Each $R^1$ is independently a $C_1$–$C_{10}$ alkyl group. $R^2$ is a $C_2$–$C_6$ alkylene group. Each of $R^3$, $R^4$, $R^5$, and $R^6$ is independently a hydrogen atom or a $C_1$–$C_4$ alkyl group except that at least one of $R^3$ and $R^4$ is a $C_1$–$C_4$ alkyl group and at least one of $R^5$ and $R^6$ is a $C_1$–$C_4$ alkyl group. W is an oxygen atom, a sulfur atom, a nitrogen-containing group, a phosphorus-containing group, or a $C_1$–$C_4$ alkylene group. Each of m and n is greater than 0.

In yet another aspect, the invention is directed to a mixture of reaction products of

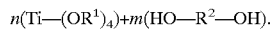

Each $R^1$ is independently a $C_1$–$C_{10}$ alkyl group. $R^2$ is a $C_2$–$C_6$ alkylene group. Each of m and n is greater than 0. The ratio of m to n is greater than 2.

In yet another aspect, the invention is directed to a method for depolymerizing a polyester. The method includes providing one or more of above-described mixtures of reaction products; contacting, in the presence of heat, a mixture including: a polyester, an organic solvent which is substantially free of oxygen and water, and one of the above-described mixtures, to produce macrocyclic oligoesters substantially free from macrocyclic co-oligoesters.

The foregoing and other objects, aspects, features, and advantages of the invention will become more apparent from the following description and claims.

DESCRIPTION

According to the present invention, organo-titanate catalysts are prepared that are useful for catalyzing depolymerization of polyesters to produce macrocyclic oligoesters substantially free from macrocyclic co-oligoesters.

Definitions

The following general definitions may be helpful in understanding the various terms and expressions used in this specification.

As used herein, a "macrocyclic" molecule means a cyclic molecule having at least one ring within its molecular structure that contains 8 or more atoms covalently connected to form the ring.

As used herein, an "oligomer" means a molecule that contains 2 or more identifiable structural repeat units of the same or different formula.

As used herein, an "oligoester" means a molecule that contains 2 or more identifiable ester functional repeat units of the same or different formula.

As used herein, a "macrocyclic oligoester" means a macrocyclic oligomer containing 2 or more identifiable ester functional repeat units of the same or different formula. A macrocyclic oligoester typically refers to multiple molecules of one specific formula having varying ring sizes. However, a macrocyclic oligoester may also include multiple molecules of different formulae having varying numbers of the same or different structural repeat units. A macrocyclic oligoester may be a co-oligoester or multi-oligoester, i.e., an oligoester having two or more different structural repeat units having an ester functionality within one cyclic molecule.

As used herein, "an alkylene group" means —$C_nH_{2n}$—, where n≧1.

As used herein, "a cycloalkylene group" means a cyclic alkylene group, —$C_nH_{2n-x}$—, where x represents the number of H's replaced by cyclization(s).

As used herein, "a mono- or polyoxyalkylene group" means [—$(CH_2)_m$—O—]$_n$—$(CH_2)_m$—, wherein m is an integer greater than 1 and n is an integer greater than 0.

As used herein, a "mixture of reaction products" means a mixture of compounds resulting from a chemical reaction. Thus, a "mixture of reaction products" may refer to a mixture of compounds resulting from a chemical reaction that includes one or more solvents and/or any side products (e.g., a mono- or di-functional alcohol). A "mixture of reaction products" may also refer to a mixture of compounds resulting from a chemical reaction and after removal or separation of one or more solvents or one or more side products, or with the addition of one or more solvents or additives.

Macrocyclic oligoesters that may be prepared using the catalysts of this invention include, but are not limited to, poly(alkylene dicarboxylate) macrocyclic oligoesters having a structural repeat unit of the formula:

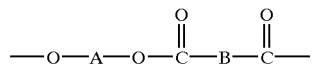

where A is an alkylene, or a cycloalkylene or a mono- or polyoxyalkylene group; and B is a divalent aromatic or alicyclic group.

Illustrative examples of macrocyclic oligoesters include macrocyclic oligoesters of poly(1,4-butylene terephthalate), poly(1,3-propylene terephthalate), poly(1,4-cyclohexylenedimethylene terephthalate), poly(ethylene terephthalate), and poly(1,2-ethylene 2,6-naphthalenedicarboxylate).

In one aspect, the invention is directed to a mixture of reaction products of

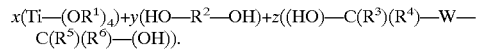

The mixture of reaction products is substantially free from di-functional diols other than HO—$R^2$—OH. That is, the mixture is substantially free from (HO)—C($R^3$)($R^4$)—W—C($R^5$)($R^6$)—(OH). "Substantially free" in this context means that the mixture of reaction products is at least 90%, and preferably 95%, free of all di-functional diols other than HO—$R^2$—OH, which is determined by the amount of diols originally present.

Referring to the above formula, each $R^1$ is independently a $C_1$–$C_{10}$ alkyl group, such as a methyl group, an ethyl group, a propyl group, an isopropyl group, a butyl group, a pentyl group, or a hexyl group. $R^2$ is a $C_2$–$C_6$ alkylene group, such as an ethylene group, a propylene group, or a butylene group. Each of $R^3$, $R^4$, $R^5$, and $R^6$ is independently a hydrogen atom or a $C_1$–$C_4$ alkyl group, such as a methyl group, an ethyl group, a propyl group, an isopropyl group, a butyl group. However, at least one of $R^3$ and $R^4$ and at least one of $R^5$ and $R^6$ is a $C_1$–$C_4$ alkyl group. Thus, (HO)—C($R^3$)($R^4$)—W—C($R^5$)($R^6$)—(OH) is a secondary or a tertiary alcohol. W is an oxygen atom, a sulfur atom, a nitrogen-containing group (e.g., a —N($R^7$)— group, wherein $R^7$ is a hydrogen atom or a $C_1$–$C_8$ alkyl group), a phosphorus-containing group (e.g., a —P($R^8$)— group, wherein $R^8$ is a hydrogen atom or a $C_1$–$C_8$ alkyl group), or preferably a $C_1$–$C_4$ alkylene group such as a methylene group, an ethylene group, a propylene group, or a butylene group. Each of x and y is greater than 0, and y is greater than z. Thus, there is more HO—$R^2$—OH than (HO)—C($R^3$)($R^4$)—W—C($R^5$)($R^6$)—(OH).

The reaction of the titanate and the diol(s) may be conducted in an organic solvent or neat. Any organic solvent may be used as long as it does not interfere with the desired reaction and the properties of the mixture of reaction products. Illustrative organic solvents that may be used include, but are not limited to, chlorohydrocarbons such as chloroaromatic hydrocarbons (e.g., o-dichlorobenzene). Preferably, no proton donating compounds such as water or acids are present during the reaction.

In one embodiment, the mixture of reaction products is prepared via a metathesis reaction. The reaction may be conducted at any temperature and pressure as long as it yields the desired mixture of reaction products. For example, the reaction may be carried out at a temperature about 25° C. to about 190° C. In one embodiment, the reaction of the titanate and the diol(s) is conducted at about 120° C. to about 180° C. In another embodiment, the reaction of the titanate and the diol(s) is conducted at about 140° C. to about 170° C. Further, the reaction may be carried out in an inert environment, such as a nitrogen environment, but such conditions are not required.

The reaction is not limited to any particular apparatus or specific processing steps. In one embodiment, the reaction is conducted in a reaction vessel that has stirring/agitation, heating, and distilling/refluxing capabilities.

The mixture of reaction products may be used in solution as a depolymerization catalyst. The mixture of reaction products may have a solvent added to it after its formation or the mixture may contain a solvent that was present during the reaction to form the mixture. Additionally the reaction products may be recovered by precipitation from solution with cooling or addition of an anti-solvent, followed by filtration. In addition, volatile components, which may include solvent, may be removed under vacuum, with or without heating.

In one embodiment, each of x, y, and z is greater than zero and y=2x–z. In this embodiment, the molar sum of the starting diols, HO—R$^2$—OH and (HO)—C(R$^3$)(R$^4$)—W—C(R$^5$)(R$^6$)—(OH), is twice the molar amount of the titanate, Ti—(OR$^1$)$_4$.

In another embodiment, z is zero and the ratio of y to x (i.e., the molar ratio of HO—R$^2$—OH to Ti—(OR$^1$)$_4$) is greater than 2, thereby providing excess diol in the reaction starting materials. In this embodiment, (HO)—C(R$^3$)(R$^4$)—W—C(R$^5$)(R$^6$)—(OH) is not present. In other embodiments, the ratio of y to x is greater than 3, greater than 4, or greater than 5.

In certain embodiments, W preferably is a C$_1$–C$_4$ alkylene group, such as a methylene group, an ethylene group, a propylene group, or a butylene group. In other embodiments, R$^1$ is an isopropyl group; R$^2$ is a butylene group; each of R$^3$, R$^4$, and R$^5$ is a methyl group; and R$^6$ is a hydrogen atom. In this embodiment, the titanate is tetraisopropyl titanate, and the diols are 1,4-butanediol and 2-methyl-2,4-pentanediol.

In another aspect, the invention is directed to a mixture of reaction products of

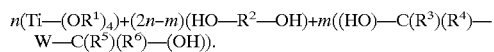

$n$(Ti—(OR$^1$)$_4$)+(2$n$–$m$)(HO—R$^2$—OH)+$m$((HO)—C(R$^3$)(R$^4$)—W—C(R$^5$)(R$^6$)—(OH)).

The mixture of reaction products is substantially free from di-functional diols, such as HO—R$^2$—OH) and (HO)—C(R$^3$)(R$^4$)—W—C(R$^5$)(R$^6$)—(OH). Each R$^1$ is independently a C$_1$–C$_{10}$ alkyl group, such as a methyl group, an ethyl group, a propyl group, an isopropyl group, a butyl group, a pentyl group, or a hexyl group. R$^2$ is a C$_2$–C$_6$ alkylene group, such as an ethylene group, a propylene group, or a butylene group. Each of R$^3$, R$^4$, R$^5$, and R$^6$ is independently a hydrogen atom or a C$_1$–C$_4$ alkyl group, such as a methyl group, an ethyl group, a propyl group, an isopropyl group, a butyl group, except that at least one of R$^3$ and R$^4$ and at least one of R$^5$ and R$^6$, is a C$_1$–C$_4$ alkyl group. W is an oxygen atom, a sulfur atom, a nitrogen-containing group (e.g., a —N(R$^7$)— group, wherein R$^7$ is a hydrogen atom or a C$_1$–C$_8$ alkyl group), a phosphorus-containing group (e.g., a —P(R$^8$)— group, wherein R$^8$ is a hydrogen atom or a C$_1$–C$_8$ alkyl group), or a C$_1$–C$_4$ alkylene group (e.g., a methylene group, an ethylene group, a propylene group, or a butylene group). Each of m and n is greater than 0.

In this aspect of the invention, the molar sum of the diols, HO—R$^2$—OH and (HO)—C(R$^3$)(R$^4$)—W—C(R$^5$)(R$^6$)—(OH), is twice the molar amount of the titanate, Ti—(OR$^1$)$_4$.

In certain embodiments, W is a C$_1$–C$_4$ alkylene group, such as a methylene group, an ethylene group, a propylene group, or a butylene group. In certain embodiments, R$^1$ is an isopropyl group. Thus, the titanate is tetraisopropyl titanate. In other embodiments, R$^2$ is a butylene group. Thus, one of the diols is 1,4-butanediol.

In yet another embodiment, R$^1$ is an isopropyl group; R$^2$ is a butylene group; each of R$^3$, R$^4$, and R$^5$ is a methyl group; and R$^6$ is a hydrogen atom. In this embodiment, the titanate oxide is tetraisopropyl titanate, and the diols are 1,4-butanediol and 2-methyl-2,4-pentanediol.

In certain embodiments, the ratio of m to 2n, which is the molar ratio of starting diol (HO)—C(R$^3$)(R$^4$)—W—C(R$^5$)(R$^6$)—(OH) to all starting diols (HO—R$^2$—OH and (HO)—C(R$^3$)(R$^4$)—W—C(R$^5$)(R$^6$)—(OH)) is within a range from about 0.1 to about 0.5, from about 0.15 to about from about 0.15 to about 0.35, or from about 0.15 to about 0.25.

The mixture of reaction products may further include an organic solvent, which may be added after the reaction. In certain embodiments, the reaction of the titanate and the diols is conducted in an organic solvent. Any organic solvent may be used as long as it does not interfere with the desired properties of the mixture of reaction products. Illustrative organic solvents that may be used include, but are not limited to, chlorohydrocarbons such as chloroaromatic hydrocarbons (e.g., o-dichlorobenzene).

Thus, the mixture of reaction products can be prepared by adding a pre-determined amount of each of Ti—(OR$^1$)$_4$, HO—R$^2$—OH, (HO)—C(R$^3$)(R$^4$)—W—C(R$^5$)(R$^6$)—(OH), an used into a reaction vessel and mixing these reagents at a pre-selected temperature and pressure. Distillation is conducted to remove R$^2$—OH. The reaction may be followed by the amount of R$^1$—OH (e.g., isopropyl alcohol) liberated from the reaction. Thus, when the reaction is heated to the boiling point of R$^1$—OH, the reaction is complete when no more R$^1$—OH can be distilled off. Alternatively, the reaction may be monitored using NMR on samples periodically taken from the reaction. Depending on factors including the starting titanate, the starting diols, the ratio of diols and their ratio to the titanate, what solvent is employed, and the reaction temperature and pressure, the mixture of reaction products may take different forms, for example, as a solution, as a solid (i.e., a precipitate from the solution), or as a liquid.

In yet another aspect, the invention is directed to a mixture of reaction products of

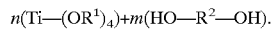

$n$(Ti—(OR$^1$)$_4$)+$m$(HO—R$^2$—OH).

Each R$^1$ is independently a C$_1$–C$_{10}$ alkyl group, such as a methyl group, an ethyl group, a propyl group, an isopropyl group, a butyl group, a pentyl group, or a hexyl group. R$^2$ is a C$_2$–C$_6$ alkylene group, such as an ethylene group, a propylene group, or a butylene group. Each of m and n is greater than 0. The ratio of m to n (i.e., the molar ratio of (HO—R$^2$—OH) to Ti—(OR$^1$)$_4$) is greater than 2.

In one embodiment, $R^1$ is an isopropyl group. Thus, the titanate is tetraisopropyl titanate. In another embodiment, $R^2$ is a butylene group. Thus, the diol is 1,4-butanediol. In yet another detailed embodiment, $R^1$ is an isopropyl group; $R^2$ is a butylene group.

In certain embodiments, the ratio of m to n, which is the molar ratio of Ti—$(OR^1)_4$ to HO—$R^2$—OH, is within a range from about 2 to about 6. In other embodiments, the ratio is within a range from about 2.5 to about 5.5, from about 3 to about 5, or from about 3.5 to about 4.5.

Excess HO—$R^2$—OH may be removed after the reaction, and substantially all of the residual HO—$R^2$—OH is separated from the rest of the mixture of reaction products. Removal may be effected by conventional techniques such as precipitation, filtration, distillation, and/or vacuum evaporation.

The reaction between the titanate (i.e., Ti—$(OR^1)_4$) and the diol (i.e., HO—$R^2$—OH) may be conducted without a solvent, i.e., neat. Thus, the mixture of reaction products does not include any solvent. However, a solvent may be added to the mixture of reaction products.

In one embodiment the mixture of reaction products can be prepared by adding a pre-determined amount of each of Ti—$(OR^1)_4$ and HO—$R^2$—OH into a reaction vessel and mixing these reagents at a pre-selected temperature and pressures. Distillation is conducted to remove $R^2$—OH. The reaction may be followed by the amount of $R^1$—OH (e.g., isopropyl alcohol) liberated from the reaction. Thus, when the reaction is heated to the boiling point of $R^1$—OH, the reaction is complete when no more $R^1$—OH can be distilled off. Alternatively, the reaction may be monitored using NMR on samples periodically taken from the reaction. Depending on factors including the starting titanate, the starting diol, the ratio of diol to the titanate, and the reaction temperature and pressure employed, the mixture of reaction products take different forms, for example, as a solid or a liquid.

In yet another aspect, the invention is directed to a method for depolymerizing a polyester (e.g., polyester linears). The method includes the step of contacting, in the presence of heat, a mixture containing: a polyester, an organic solvent which is substantially free of oxygen and water, and one or more of the above-described mixtures of reaction products, to produce macrocyclic oligoesters substantially free from macrocyclic co-oligoesters.

The reaction temperatures that may be chosen in the depolymerization reaction are unlimited. That is, any temperature that results in depolymerization of polyester in the solvent may be employed. However, the depolymerization reaction often is conducted at an elevated temperature. The depolymerization reaction may be conducted below, at, or above the melting point of the polyester to be depolymerized. In one embodiment, the depolymerization reaction temperatures is from about 150° C. to about 280° C. In other embodiments, the temperature is from about 180° C. to about 260° C., or from about 220° C. to about 250° C.

An organic solvent is typically used in the depolymerization reaction. Any solvent that does not interfere with the depolymerization reaction may be used. Illustrative examples of such solvents include chlorohydrocarbons, such as o-dichlorobenzene. The solvent generally is substantially free from oxygen and water. "Substantially free" in this context means a concentration of oxygen less than about 50 ppm, and more preferably less than 10 ppm, and a concentration of water less than about 50 ppm, and more preferably less than 10 ppm.

There is no limitation with respect to the amount of solvent present in a depolymerization reaction other than the amount results in the dissolution and subsequent depolymerization of the polyester. The concentration of the resulting solution often is less than about 0.5 M. In certain embodiments, the concentration of the resulting solution is less than about 0.3 M, less than about 0.2 M, or less than about 0.1 M.

The depolymerization reaction is typically conducted under ambient atmospheric pressure and does not need to be conducted in an inert environment. However, the reaction may be conducted in an inert environment, such as a nitrogen or argon environment.

The amount of catalyst employed in the depolymerization reaction is typically from about 0.5 to about 10.0 mole percent titanate for every polyester monomer unit. In one embodiment, the amount of catalyst employed is from about 1.0 to about 5.0 mole percent for every polyester monomer unit. In another embodiment, the amount of catalyst employed is from about 2.0 to about 3.0 mole percent for every polyester monomer Unit.

There is no limitation with respect to the apparatus or equipment that may be employed to conduct the depolymerization reaction other than allowing the depolymerization of the polyester.

Polyesters that may be depolymerized to produce macrocyclic oligoesters according to the method of the invention include, but not limited to, poly(alkylene dicarboxylates) such as poly(1,4-butylene terephthalate), poly(ethylene terephthalate), and co-polyesters thereof.

Macrocyclic oligoesters prepared according to methods of the invention typically are substantially free of macrocyclic co-oligoesters. "Substantially free" in this context means that the weight percentage of macrocyclic co-oligoesters is less than about 10% and preferably less than about 5% of all macrocyclic oligoesters prepared. When the polyester which is depolymerized contains a co-polymer, e.g., poly(1,4-butylene terephthalate) containing poly(ethylene terephthalate), "substantially free" in this context means that the weight percentage of macro cyclic oligoester of butylene, macro cyclic oligo esters of ethylene, and macrocyclic co-oligoester of butylene/ethylene is greater than 90% and preferably greater than 95% of all macrocyclic oligoesters produced.

EXAMPLES

The following examples are provided to further illustrate and to facilitate the understanding of the invention. These specific examples are intended to be illustrative of the invention. The products obtained from these examples may be confirmed by conventional techniques such as proton ($^1$H) and carbon-13 ($^{13}$C) nuclear magnetic resonance (NMR) spectroscopy, mass spectroscopy, infrared spectroscopy, differential scanning calorimetry, and gel permeation chromatography analyses.

Example 1

A 100 mL flask equipped with a magnetic stir bar and fitted with a septum was flame dried under vacuum then filled with an inert gas. Tetraisopropyl titanate (15 mmol) is added followed by diols (30 mmole) then dry o-dichlorobenzene (25 mL). After the addition of all reagents the flask was fitted with a short path distillation head and heated in an oil bath to 140° C. for about 1 hour. Isopropyl alcohol liberated from the reaction of tetraisopropyl titanate and the diols was collected and then the solution was heated in 200° C. oil to strip off 15 ml of the o-dichlorobenzene to ensure that all isopropyl alcohol was removed. Upon cooling the resulting solution was about 1 M in titanium.

Example 1a
Ti-(butanediol: diethylene glycol=3:1)

The preparation is as outlined in Example 1 except that the diol in this case was a mixture of 3 molar parts butanediol and 1 molar part diethylene glycol per molar part of tetraisopropyl titanate. A well-behaved solution (e.g., no gelation) of reaction products resulted.

Example 1b
Ti-(butanediol: diethylene glycol=1:1)

The preparation is as outlined in Example 1 except that the diol in this case was a mixture of 1 molar part butanediol and 1 molar part diethylene glycol per molar part of tetraisopropyl titanate. A well-behaved solution of reaction products resulted.

Example 1c
Ti-(butanediol: diethylene glycol=0:2)

The preparation is as outlined in Example 1 except that the diol in this case was diethylene glycol (2 molar equivalents to tetraisopropyl titanate). Upon cooling the solid titanate precipitated from solution and was collected on a filter and used as a neat solid.

Example 1d
Ti-(butanediol: 2-methyl-2,4-pentandiol=4:1)

The preparation is as outlined in Example 1 except that the diol in this case was 4 mole parts butanediol and 1 mole part 2-methyl-2,4-pentandiol (hexylene glycol) per molar part of tetraisopropyl titanate. The solution was slightly viscous at 1 M. Titanate products gelled from solution above 1.5M.

Example 1e
Ti-(butanediol: 2-methyl-2,4-pentandiol=0:2)

The preparation is as outlined in Example 1 except that the diol in this case was 2 molar parts of 2-methyl-2,4-pentandiol (hexylene glycol) per molar part of tetraisopropyl titanate. A well-behaved thin solution resulted.

Example 2

Depolymerization

Poly(1,4-butylene terephthalate) solutions were prepared at 0.07 M by dissolving poly(1,4-butylene terephthalate) (PBT) in o-dichlorobenzene at 180° C. under inert atmosphere (84.8 g of o-dichlorobenzene per gram of poly(1,4-butylene terephthalate)). A catalyst was added using a syringe. The reaction was heated at reflux (184° C.) until equilibrium was reached (usually within about 1.5 hours). The reaction was sampled and diluted with tetrahydrofuran (5 ml) containing an internal standard (e.g., phenanthrene from Sigma-Aldrich Corp., St. Louis, Mo.). The sample was then filtered and injected on HPLC gradient program where the individual macrocyclic oligoesters were quantified. Macrocyclic oligoesters isolated from depolymerization reactions were compounded with 0.3 mol % of commercially available butyltin dihydroxide chloride (FASCAT™ 4101 from Atochem) and polymerized at 190° C. for 1 hour. Samples of the resulting polymer are then analyzed by differential scanning calorimetry.

Results are tabulated below.

TABLE 1

Yield and Composition of Depolymerizations

| Experiment | Catalyst | Catalyst level (mol %) | Yield (Macrocyclic Oligoester, % of PBT) | Macrocyclic Co-oligoester (% of Macrocyclic oligoesters) |
|---|---|---|---|---|
| a | Ti-(BD:DEG = 3:1) | 4.0 | 50.3 | 5.3 |
| b | Ti-(BD:DEG = 1:1) | 4.0 | 62.2 | 11.9 |
| c | Ti-(BD:DEG = 0:2) | 4.6 | 82.0 | 21.1 |
| d | Ti-(BD:HG = 4:1) | 2.8 | 51.8 | Nd < 0.5 |
| e | Ti-(BD:HG = 0:2) | 3.0 | 6.9 | Nd < 0.5 |

BD: 1,4-butanediol
DEG: diethylene glycol
HG: 2-methyl-2,4-pentandiol (hexylene glycol)
Nd.: Not detected.

TABLE 2

Properties of Polymers Prepared from Macrocyclic Oligoesters

| Polymer | Catalyst Preparation, % | Co-monomer (%) | m.p. (Tm) | Glass Trans. (Tg) | Crystallinity (%) |
|---|---|---|---|---|---|
| PBT | Example 1d, 3% | 0 | 232.2° C. | 46.8° C. | 46.4 |
| PBT | Example 1b, 7% | 7 | 223.1° C. | 44.5° C. | 39.8 |
| 5% PET/PBT | Example 1d, 5% | 5 | 226.0° C. | 46.1° C. | 43.3 |
| 10% PET/PBT | Example 1d, 5% | 10 | 221.8° C. | 43.7° C. | 38.3 |

PBT: poly(1,4-butylene terephthalate)
PET: poly(ethylene terephthalate)
PET/PBT: co-polyester containing both poly(ethylene terephthalate) and poly(1,4-butylene terephthalate), the percentage being the percentage of ethylene units over the total units of ethylene and butylene.

Example 3a

Ti-(butanediol) 4 eq.

A 100 mL round bottom flask equipped with a mechanical stir bar was charged, under argon atmosphere, with butanediol (11.76 g, 130,5 mmol, 4 eq.) and then with tetraisopropyl titanate (9.27 g, 32.6 mmol, 1 eq.). The flask was fitted with a short path distillation head and submerged in a hot oil bath (170° C.) to remove isopropyl alcohol from reaction. When the distillation of isopropyl alcohol ceased the flask was cooled to 100° C. Vacuum was applied to strip out any residual isopropyl alcohol. The titanate material was viscous (honey like) at 100° C. and became extremely viscous upon cooling to room temperature.

Example 3b

Ti-(butanediol) 3 eq.

The procedure of Example 3a was repeated except that the flask was charged with butanediol (12.60 g, 139.8 mmol, 3 eq.) and tetraisopropyl titanate (13.25 g, 46.6 mmol, 1 eq.). This material was extremely viscous even at 120° C., impossible to pump into reactor.

Example 4

Depolymerization

A 250 mL 3-neck flask was equipped with a mechanical stirrer, a short path distillation head, a receiver, and a Claisen head fitted with a thermometer and an inert gas inlet. The flask was charged with o-dichlorobenzene (173.8 g), poly (1,4-butylene terephthalate) (1.81 g, plastic pellets VALOX 315™ from General Electric Plastics Co., Mt. Vernon, Ind.) and was heated in an oil bath to dissolve the plastic pellets. The distillate (22 g) was removed overhead to dry the reactants. Then, a solution of Ti (butanediol) 4 eq. in o-dichlorobenzene (272 mg as prepared in Example 3a and was dissolved in 3 g of 100° C. o-dichlorobenzene, 2.8 mol % Titanate) was added. The reaction was held at 180° C. and sampled at half hour and at 2 hours to follow equilibration to macrocyclic butylene oligoesters. Yield of macrocyclic butylene oligoesters was 51.5% at half hour and 60.2% at 2 hours. Macrocyclic oligoesters showed no trace of co-oligoester according to HPLC.

Each of the patent documents disclosed hereinabove is incorporated by reference herein in their entirety. Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A mixture of reaction products of

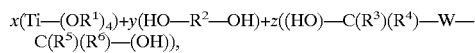

the mixture being substantially free from di-functional diols other than HO—R²—OH, wherein each $R^1$ is independently a $C_1$–$C_{10}$ alkyl group;

$R^2$ is a $C_2$–$C_6$ alkylene group;

each of $R^3$, $R^4$, $R^5$, and $R^6$ is independently a hydrogen atom or a $C_1$–$C_4$ alkyl group except that at least one of $R^3$ and $R^4$ is a $C_1$–$C_4$ alkyl group, and at least one of $R^5$ and $R^6$ is a $C_1$–$C_4$ alkyl group;

W is an oxygen atom, a sulfur atom, a nitrogen-containing group, a phosphorus-containing group, or a $C_1$–$C_4$ alkylene group;

each of x and y is greater than 0; and y>z.

2. The mixture of claim 1 wherein y=2x−z and each of x, y, z is a number greater than 0.

3. The mixture of claim 1 wherein z=0 and y/x>2.

4. The mixture of claim 1 where W is a $C_1$–$C_4$ alkylene group.

5. The mixture of claim 4 wherein $R^1$ is an isopropyl group; $R^2$ is a butylene group; each of $R^3$, $R^4$, and $R^5$ is a methyl group; and $R^6$ is a hydrogen atom.

6. The mixture of claim 1 wherein the mixture of reaction products is substantially free from all mono- and di-functional alcohols.

7. A mixture of reaction products of

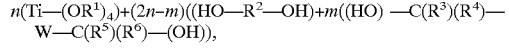

the mixture being substantially free from di-functional dials, wherein each $R^1$ is independently a $C_1$–$C_{10}$ alkyl group;

$R^2$ is a $C_2$–$C_6$ alkylene group;

each of $R^3$, $R^4$, $R^5$, and $R^6$ is independently a hydrogen atom or a $C_1$–$C_4$ alkyl group except that at least one of $R^3$ and $R^4$ is a $C_1$–$C_4$ alkyl group, and at least one of $R^5$ and $R^6$ is a $C_1$–$C_4$ alkyl group;

W is an oxygen atom, a sulfur atom, a nitrogen-containing group, a phosphorus-containing group, or a $C_1$–$C_4$ alkylene group; and each of m and n is greater than 0.

8. The mixture of claim 7 where W is a $C_1$–$C_4$ alkylene group.

9. The mixture of claim 7 wherein $R^1$ is an isopropyl group.

10. The mixture of claim 7 wherein $R^2$ is a butylene group.

11. The mixture of claim 7 wherein $R^1$ is an isopropyl group; $R^2$ is a butylene group; each of $R^3$, $R^4$, and $R^5$ is a methyl group; $R^6$ is a hydrogen atom; and W is a methylene group.

12. The mixture of claim 7 wherein m/2n is between about 0.1 to about 0.5.

13. The mixture of claim 12 wherein m/2n is between about 0.15 to about 0.25.

14. The mixture of claim 7 further comprising an organic solvent.

15. The mixture of claim 7 wherein the mixture is obtained from a reaction conducted in an organic solvent.

16. The mixture of claim 15 wherein the organic solvent is a chlorohydrocarbon.

17. The mixture of claim 16 wherein the organic solvent is o-dichlorobenzene.

18. The mixture of claim 7 wherein the mixture of reaction products is substantially free from all mono- and di-functional alcohols.

19. A method for depolymerizing a polyester comprising the step of contacting, in the presence of heat, a mixture comprising: a polyester, an organic solvent which is substantially free of oxygen and water, and the mixture of claim 1, to produce macrocyclic oligoesters free from macrocyclic co-oligoesters.

20. The method of claim 19 wherein the polyester comprise poly(1,4-butylene terephthalate).

21. A method for depolymerizing a polyester comprising the step of contacting, in the presence of heat, a mixture comprising: a polyester, an organic solvent which is substantially free of oxygen and water, and the mixture of claim 7, to produce macrocyclic oligoesters substantially free from macrocyclic co-oligoesters.

22. A method for depolymerizing a polyester to produce macrocyclic oligoesters substantially free from macrocyclic co-oligoesters, the method comprising the step of contacting, in the presence of heat, a mixture comprising: a polyester, an organic solvent which is substantially free of oxygen and water, and a mixture of reaction products of:

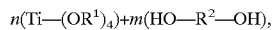
$n(\text{Ti}-(\text{OR}^1)_4)+m(\text{HO}-\text{R}^2-\text{OH})$, wherein each $R^1$ is independently a $C_1$–$C_{10}$ alkyl group;

$R^2$ is an unbranched $C_2$–$C_6$ alkylene group; and each of m and n is greater than 0, and m/n>2.

23. The mixture of claim 1 wherein W is an oxygen atom, a sulfur atom, a nitrogen-containing group, a phosphorus-containing group, an ethylene group, a propylene group, or a butylene group.

24. A method for depolymerizing a polyester comprising the step of contacting, in the presence of heat, a polyester, an organic solvent, and a mixture of reaction products of

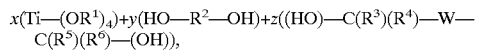
$x(\text{Ti}-(\text{OR}^1)_4)+y(\text{HO}-\text{R}^2-\text{OH})+z((\text{HO})-\text{C}(R^3)(R^4)-\text{W}-\text{C}(R^5)(R^6)-(\text{OH}))$, wherein each $R^1$ is independently a $C_1$–$C_{10}$ alkyl group;

$R^2$ is a $C_2$–$C_6$ alkylene group;

each of $R^3$, $R^4$, $R^5$ and $R^6$ is independently a hydrogen atom or a $C_1$–$C_4$ alkyl group;

W is an oxygen atom, a sulfur atom, a nitrogen-containing group, a phosphorus-containing group, or a $C_1$–$C_4$ alkylene group;

each of x and y is greater than 0; and y>z.

25. The method of claim 24 wherein the mixture of reaction products is substantially free from di-functional diols other than HO—$R^2$—OH.

26. A method for depolymerizing a polyester comprising the step of contacting, in the presence of heat, a polyester, an organic solvent, and a mixture of reaction products of

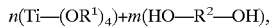
$n(\text{Ti}-(\text{OR}^1)_4)+m(\text{HO}-\text{R}^2-\text{OH})$, wherein each $R^1$ is independently a $C_1$–$C_{10}$ alkyl group;

$R^2$ is a $C_2$–$C_6$ alkylene group; and each of m and n is greater than 0, and m/n>2.

27. The method of claim 26 wherein $R^1$ is an isopropyl group.

28. The method of claim 26 wherein $R^2$ is a butylene group.

29. The method of claim 26 wherein $R^1$ is an isopropyl group and $R^2$ is a butylene group.

30. The method of claim 26 wherein 5>m/n>3.

31. The method of claim 26 wherein the mixture is obtained from a reaction conducted without a solvent.

32. The method of claim 26 substantially free of all mono- and di-functional alcohols.

33. The method of claim 26 wherein $R^2$ is an unbranched $C_2$–$C_6$ alkylene group.

* * * * *